United States Patent
Dai et al.

(10) Patent No.: US 12,188,137 B2
(45) Date of Patent: Jan. 7, 2025

(54) FACILE FORMATION OF HIGHLY ACTIVE AND STABLE HYDROGEN EVOLUTION CATALYSTS

(71) Applicant: The Board of Trustees of the Leland Stanford Junior University, Stanford, CA (US)

(72) Inventors: Hongjie Dai, Stanford, CA (US); Jianan Erick Huang, Stanford, CA (US); Michael J. Kenney, Stanford, CA (US); Yun Kuang, Stanford, CA (US); Yongtao Meng, Stanford, CA (US); Xin Tian, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1155 days.

(21) Appl. No.: 16/969,779

(22) PCT Filed: Feb. 15, 2019

(86) PCT No.: PCT/US2019/018322
§ 371 (c)(1),
(2) Date: Aug. 13, 2020

(87) PCT Pub. No.: WO2019/161279
PCT Pub. Date: Aug. 22, 2019

(65) Prior Publication Data
US 2020/0407861 A1  Dec. 31, 2020

Related U.S. Application Data

(60) Provisional application No. 62/631,139, filed on Feb. 15, 2018.

(51) Int. Cl.
*C25B 11/091* (2021.01)
*C25B 1/04* (2021.01)
*C25B 11/051* (2021.01)

(52) U.S. Cl.
CPC .............. *C25B 11/091* (2021.01); *C25B 1/04* (2013.01); *C25B 11/051* (2021.01)

(58) Field of Classification Search
CPC ........ C25B 11/091; C25B 11/051; C25B 1/04
USPC .......................................... 502/101; 427/115
See application file for complete search history.

(56) References Cited

U.S. PATENT DOCUMENTS

| 4,414,064 A | * | 11/1983 | Stachurski ............ C25B 11/091 205/333 |
| 2011/0024695 A1 | | 2/2011 | Hwang |
| 2016/0017507 A1 | | 1/2016 | Dai et al. |

OTHER PUBLICATIONS

International Preliminary Report on Patentability on PCT/US2019/018322 dated Aug. 27, 2020 (2 pages).
Faber, M.S. et a., "Earth-abundant inorganic electrocatalysts and their nanostructures for energy conversion applications", Energy & environmental science, 2014, vol. 7, No. 11, pp. 3519-3542.
Gong, M. et al., "A mini review on nickel-based electrocatalysts for alkaline hydrogen evolution reaction", Nano Research, 2016, vol. 9, No. 1, pp. 28-46.
Gong, M. et al., "Blending Cr2O3 into NiO—Ni electrocatalyst for sustained water splitting", Angewandte Chemie, International Edition, 2015, vol. 54, No. 41, pp. 11989-11993.
Gong, M. et al., "Nanoscale nickel oxide/nickel heterostructures for active hydrogen evolution electrocatalysis", Nature communications, 2014, vol. 5, pp. 4695(1)-4695(6).
International Search Report and Written Opinion for PCT Application No. PCT/US2019/018322 issued May 28, 2019, 13 pages.
Zhu, W. et al., "Design and application of foams for electrocatalysis", ChemCatChem, 2017, vol. 9, No. 10, pp. 1721-1743.

\* cited by examiner

*Primary Examiner* — Patricia L. Hailey
(74) *Attorney, Agent, or Firm* — Foley & Lardner LLP

(57) ABSTRACT

A method of forming a cathode for hydrogen evolution reaction includes: (1) providing a substrate; (2) forming a precursor layer covering the substrate; and (3) annealing the precursor layer to form an electrocatalyst layer covering the substrate.

15 Claims, 9 Drawing Sheets

FACILE FORMATION OF HIGHLY ACTIVE AND STABLE HYDROGEN EVOLUTION CATALYSTS

CROSS-REFERENCE TO RELATED APPLICATION

This application is a National Stage Entry of PCT/US2019/018322, filed Feb. 15, 2019, which claims the benefit of and priority to U.S. Provisional Application No. 62/631,139, filed Feb. 15, 2018, the contents of which are incorporated herein by reference in their entirety.

STATEMENT REGARDING FEDERALLY SPONSORED RESEARCH OR DEVELOPMENT

This invention was made with Government support under contract DE-SC0016165 awarded by the Department of Energy. The Government has certain rights in the invention.

BACKGROUND

The electrolysis of water to generate oxygen and hydrogen fuel is a promising solution to the intermittency challenges faced by many renewable sources of energy, such as solar and wind. Ideally, these sources can generate hydrogen fuel during peak hours that can be utilized off-site or during off hours. Hydrogen has a high gravimetric energy density (about 142 MJ/kg) and its use in a fuel cell generates water and electricity. These qualities make hydrogen an attractive energy carrier in a carbon-free power system.

Water splitting can be broken into two half-cell reactions referred to as the hydrogen evolution reaction (HER) and the oxygen evolution reaction (OER). The development of inexpensive, active and stable catalysts to reduce overpotential losses from these two difficult reactions is the subject of significant research. Many materials have been explored for HER but the most effective catalyst remains platinum (Pt). Unfortunately, Pt cannot be used on a large scale due to its high cost and scarcity.

It is against this background that a need arose to develop embodiments of this disclosure.

SUMMARY

In some embodiments, a method of forming a cathode for HER includes: (1) providing a substrate; (2) forming a precursor layer covering the substrate; and (3) annealing the precursor layer to form an electrocatalyst layer covering the substrate.

In some embodiments, a method of forming a cathode for HER includes: (1) providing a substrate; (2) forming a precursor layer covering the substrate; and (3) annealing the precursor layer to form an electrocatalyst layer covering the substrate, wherein forming the precursor layer is by anodization in the presence of an electrolyte solution including a metal and anions, and the metal and the anions are incorporated within the precursor layer.

In some embodiments, a cathode for HER includes: (1) a substrate; and (2) an electrocatalyst layer covering the substrate, wherein the electrocatalyst layer includes anions.

In some embodiments, a water electrolyzer is provided and includes the cathode of the foregoing embodiments. In some embodiments, a method of operating the water electrolyzer includes generating oxygen and hydrogen from water.

In some embodiments, a method of forming a cathode for HER includes: (1) providing a substrate; (2) affixing precursor particles to the substrate; and (3) annealing the precursor particles in a reducing environment or atmosphere to form electrocatalyst particles affixed to the substrate.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

Figure 7:
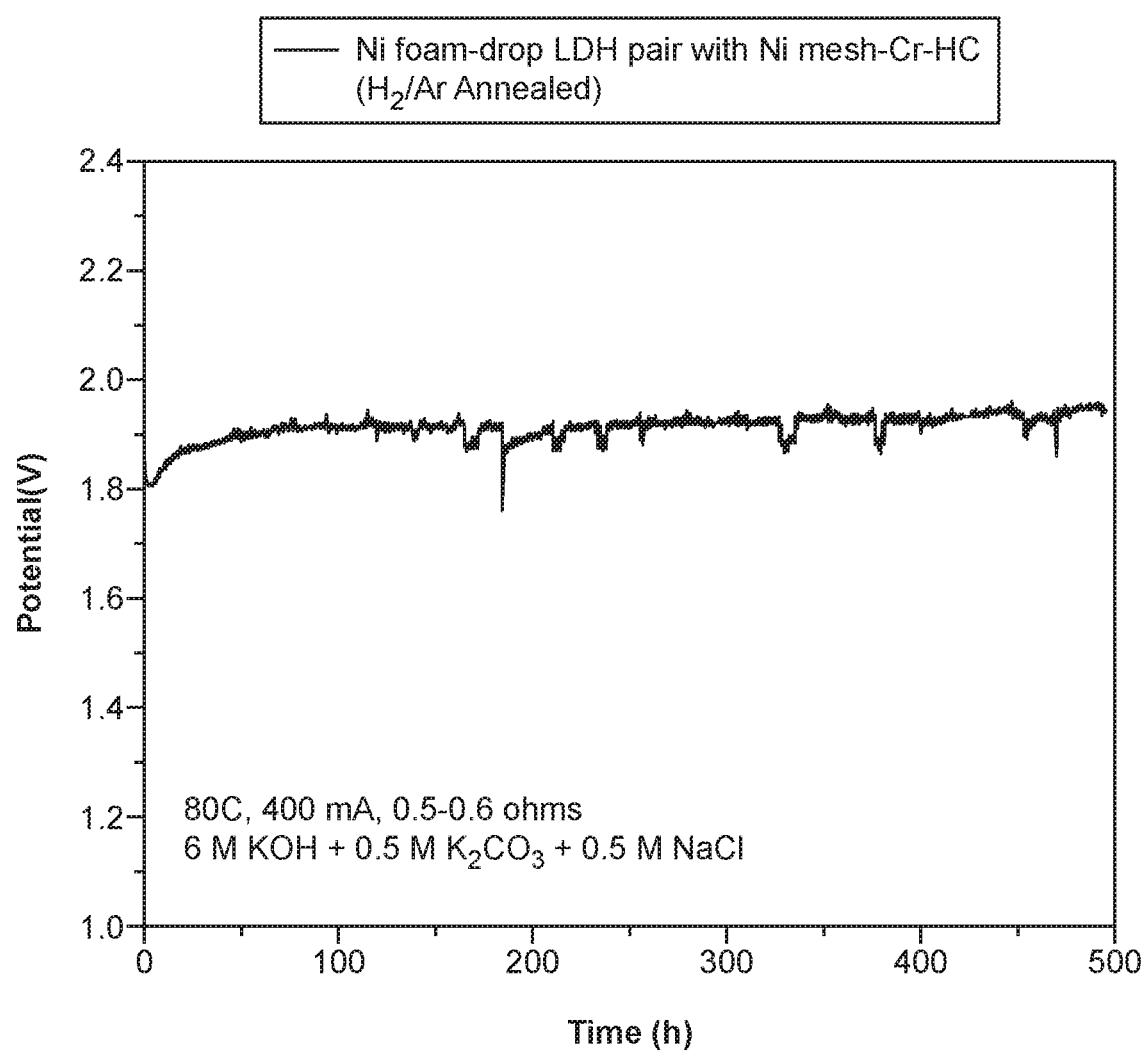

FIG. 7: Long term stability test of Ni mesh-Cr—HC (annealed) at high temperature (about 80° C.) at about 400 mA/cm$^2$ by pairing with NiFe-LDH anode, where an electrolyte is about 6 M KOH, about 0.5 M K$_2$CO$_3$ and about 0.5 M NaCl.

Figure 8:
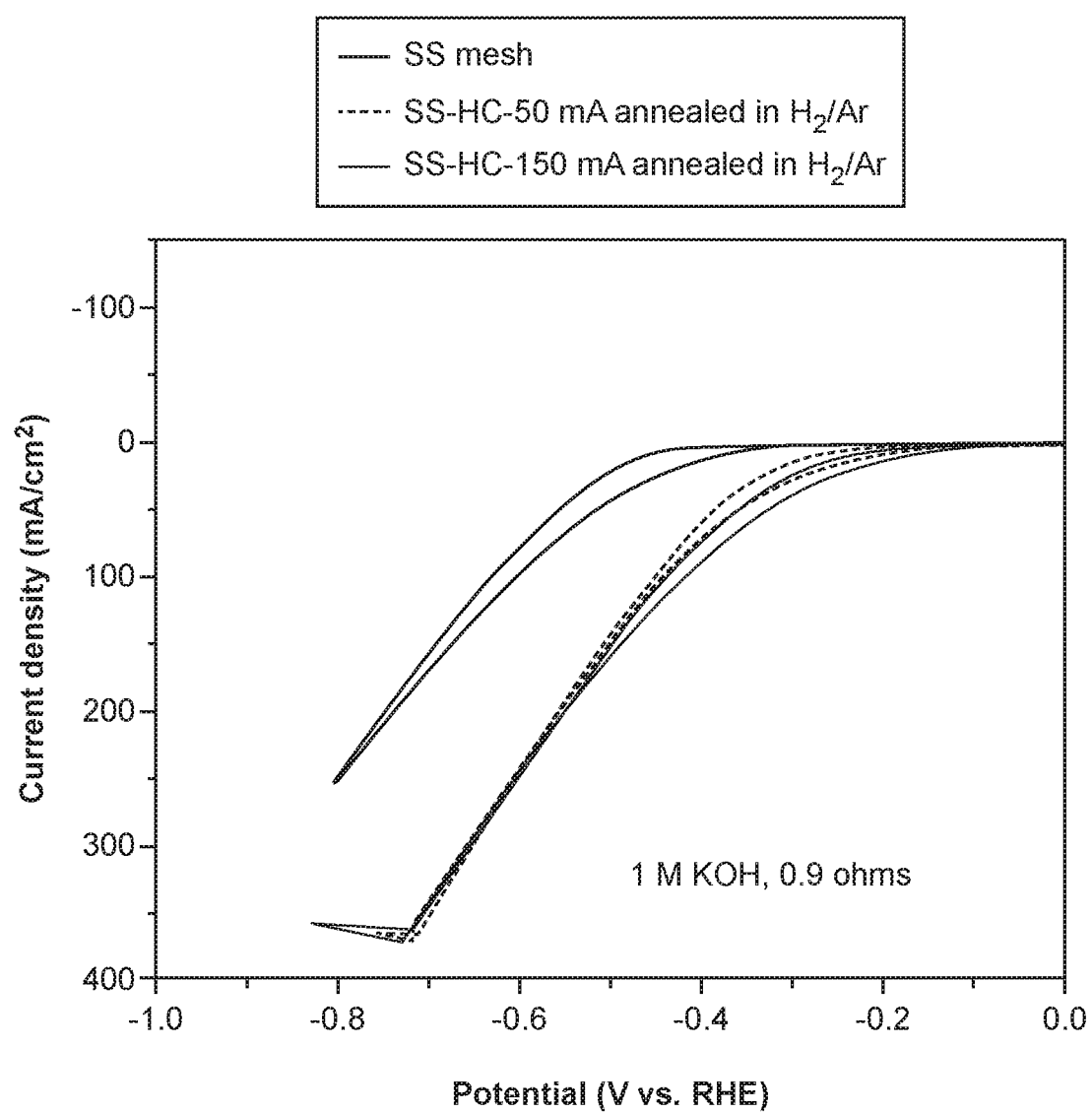

FIG. 8: LSVs of stainless steel (SS) mesh, SS—HC (about 50 mA) annealed in about 2% H$_2$/Ar and SS—HC (about 150 mA) annealed in about 2% H$_2$/Ar in about 1 M KOH. iR was not compensated in these experiments.

Figure 9:
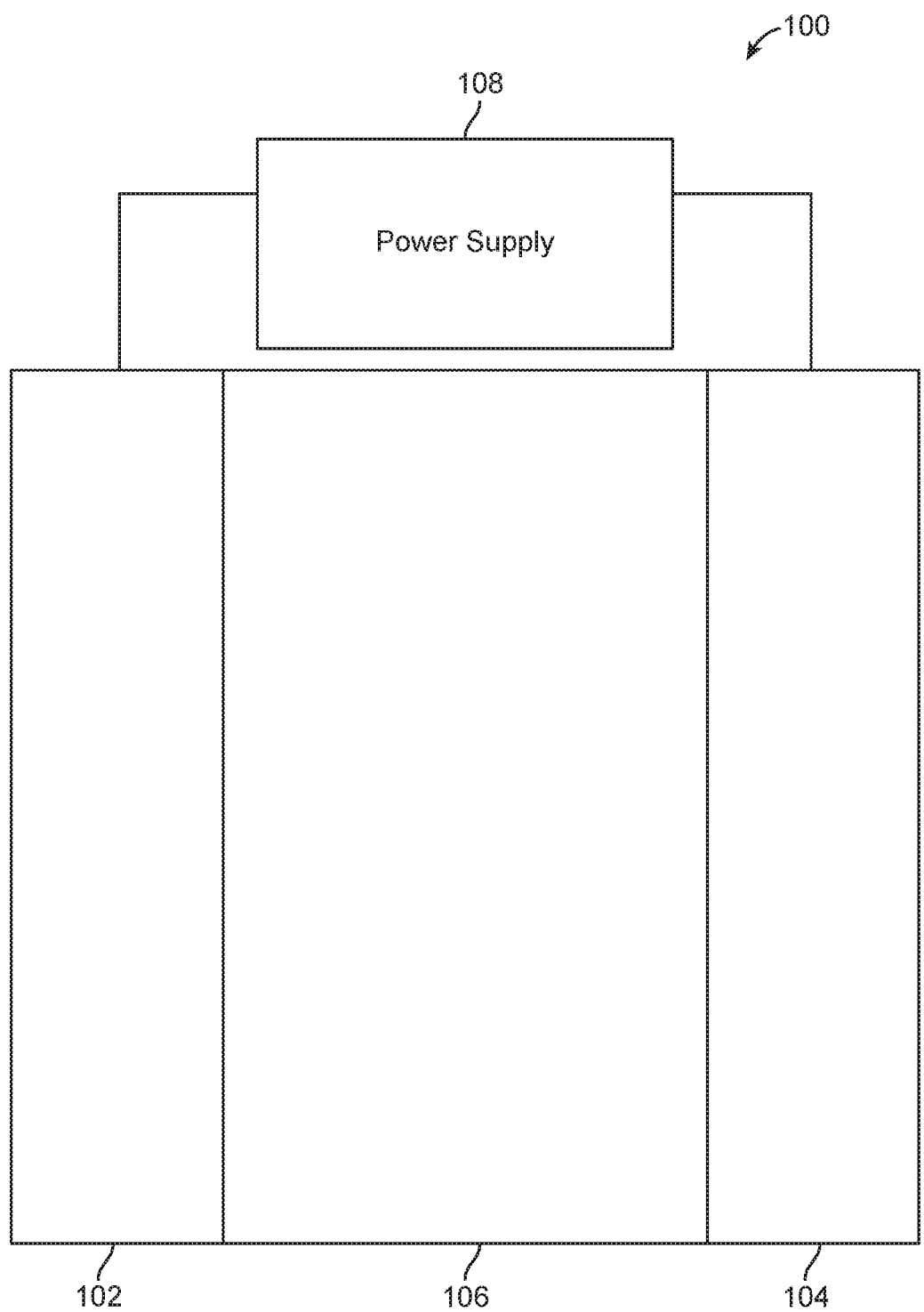

FIG. 9: Schematic of a water electrolyzer according to some embodiments.

DESCRIPTION

FIG. 9 shows a water electrolyzer 100 that includes an anode 102, a cathode 104, and an electrolyte 106 disposed between and in contact with the anode 102 and the cathode 104, according to some embodiments. The anode 102 is configured to promote water oxidation or OER and includes an OER electrocatalyst affixed to a substrate. The cathode 104 is configured to promote water reduction or HER, includes an HER electrocatalyst affixed to a substrate, and can be synthesized according to manufacturing methods explained herein.

In some embodiments, the substrate included in the cathode 104 is a conductive substrate. In some embodiments, the substrate included in the cathode 104 is a metallic substrate, such as including nickel in the form of elemental nickel, a nickel-containing alloy (e.g., nickel iron alloy, nickel cobalt alloy, stainless steel, nickel chromium alloy, or nickel cobalt ferrous alloy), or a nickel-coated base substrate (e.g., nickel-coated iron substrate). In some embodiments, the substrate is a porous substrate. A porosity of the porous substrate can be represented as a ratio of a volume of voids relative to a total volume, namely between 0 and 1, or as a percentage between 0% and 100%. In some embodiments, the porous substrate can have a porosity that is at least about 0.05 or at least about 0.1 and up to about 0.98 or more, and, more particularly, the porosity can be in a range of about 0.1 to about 0.98, about 0.2 to about 0.98, about 0.3 to about 0.98, about 0.4 to about 0.95, about 0.5 to about 0.95, about 0.6 to about 0.95, or about 0.7 to about 0.95. Techniques for determining porosity include, for example, porosimetry and optical or scanning techniques. Examples of suitable porous substrates include metallic foams, such as nickel foams, nickel iron foams, nickel cobalt foams, and stainless steel (e.g., doped with molybdenum such as stainless steel 316) foams, and non-metallic foams, such as carbon foams, graphite foams, and graphene foams. Other catalyst supports or substrates can be included in place of, or in combination with, metallic or non-metallic foams, such as metallic or non-metallic foils or meshes, such as nickel foils or meshes, stainless steel foils or meshes, nickel chromium foils or meshes, or nickel cobalt ferrous alloy foils or meshes, as well as conductive carbonaceous substrates.

The electrolyte 106 is an aqueous electrolyte and can be alkaline, acidic, or neutral. The water electrolyzer 100 also includes a power supply 108, which is electrically connected to the anode 102 and the cathode 104 and is configured to supply electricity to promote OER and HER at the anode 102 and the cathode 104, respectively. The power supply 108 can include, for example, a primary or secondary battery or a solar cell. Although not shown in FIG. 9, a selectively permeable membrane or other partitioning component can be included to partition the anode 102 and the cathode 104 into respective compartments.

Example Embodiments of Cathode:

In some embodiments, the cathode 104 for HER can be formed according to a manufacturing method including: (1) providing a substrate; (2) forming a precursor layer coating or covering the substrate; and (3) annealing the precursor layer to form an electrocatalyst layer coating or covering the substrate.

In some embodiments, providing the substrate in (1) includes loading nanostructures on the substrate, and forming the precursor layer is performed on the substrate loaded with the nanostructures. In some embodiments, the nanostructures include a metal, such as nickel. In some embodiments, the nanostructures include carbon.

In some embodiments, forming the precursor layer in (2) is performed by electrodeposition. In some embodiments, forming the precursor layer by electrodeposition includes providing a precursor solution including salts of one or two or more different metals, such as a first metal-containing salt and a second metal-containing salt, and electrodepositing the precursor layer on the substrate from the precursor solution. In some embodiments, the first metal and the second metal are different transition metals. In some embodiments, the first metal is nickel, and the second metal is chromium. In some embodiments, the first metal-containing salt is a nitrate, and the second metal-containing salt is a nitrate. Other types of salts are encompassed, including acetates, citrates, halides (e.g., chlorides), sulfates, carbonates, and combinations thereof. In some embodiments, a molar ratio of the first metal to the second metal in the precursor solution is greater than about 1:1, such as about 2:1 or greater, about 3:1 or greater, about 4:1 or greater, about 5:1 or greater, about 6:1 or greater, about 7:1 or greater, or about 8:1 or greater. In some embodiments, the precursor solution includes salts of three or more different metals, such as the first metal-containing salt, the second metal-containing salt, and a third metal-containing salt where the third metal is cobalt, iron, manganese, molybdenum, or tungsten, including, for example, a combination of nickel, chromium, and cobalt, a combination of nickel, chromium, and iron, a combination of nickel, chromium, and manganese, a combination of nickel, chromium, and molybdenum, or a combination of nickel, chromium, and tungsten. In some embodiments, the precursor solution is an aqueous solution. In some embodiments, the precursor solution is devoid of dimethylformamide. In some embodiments, a concentration of each metal in the precursor solution is in a range of about 0.001 mM to about 100 mM, about 0.001 mM to about 10 mM, about 0.001 mM to about 1 mM, about 0.01 mM to about 100 mM, about 0.01 mM to about 10 mM, or about 0.01 mM to about 1 mM. In some embodiments, electrodepositing the precursor layer on the substrate from the precursor solution is performed while agitating the precursor solution. In some embodiments, electrodepositing the precursor layer on the substrate from the precursor solution is performed without agitating the precursor solution.

In some embodiments, forming the precursor layer in (2) is performed by hydrothermal treatment, co-precipitation, or reflux. In some embodiments, forming the precursor layer by hydrothermal treatment includes providing a precursor solution including salts of one or two or more different metals, such as a first metal-containing salt and a second metal-containing salt, adjusting a pH of the precursor solution to a range of about 7 to about 14 or about 7.5 to about 14 by adding a neutralizing agent to the precursor solution, and then dipping, drop-casting, immersing, or otherwise coating or exposing the substrate to the precursor solution, and then heating the precursor solution and the substrate to a temperature in a range of about 25° C. to about 300° C. or about 100° C. to about 300° C. for about 1 hour to about 48 hours or about 2 hours to about 48 hours, thereby forming the precursor layer on the substrate from the precursor solution. Examples of suitable neutralizing agents include alkaline agents in the form of inorganic salts and organic compounds, such as urea, ammonium, and sodium hydroxide. In some embodiments, the first metal and the second metal are different transition metals. In some embodiments, the first metal is nickel, and the second metal is chromium. In some embodiments, the first metal-containing salt is a nitrate, and the second metal-containing salt is a nitrate. Other types of salts are encompassed, including oxides, acetates, citrates, halides (e.g., chlorides), sulfates, carbonates, and combinations thereof. In some embodiments, a molar ratio of the first metal to the second metal in the precursor solution is greater than about 1:1, such as about 2:1 or greater, about 3:1 or greater, about 4:1 or greater, about 5:1 or greater, about 6:1 or greater, about 7:1 or greater, or about 8:1 or greater. In some embodiments, the precursor solution includes salts of three or more different metals, such as the first metal-containing salt, the second metal-containing salt, and a third metal-containing salt where the third metal is cobalt, iron, manganese, molybdenum, or tungsten, including, for example, a combination of nickel, chromium, and cobalt, a combination of nickel, chromium, and iron, a combination of nickel, chromium, and manganese, a combination of nickel, chromium, and molybdenum, or a combination of nickel, chromium, and tungsten. In some embodiments, the precursor solution is an aqueous solution. In some embodiments, the precursor solution is devoid of dimethylformamide. In some embodiments, a concentration of each metal in the precursor solution is in a range of about 0.001 mM to about 100 mM, about 0.001 mM to about 10 mM, about 0.001 mM to about 1 mM, about 0.01 mM to about 100 mM, about 0.01 mM to about 10 mM, or about 0.01 mM to about 1 mM.

In some embodiments, forming the precursor layer in (2) is performed while heating the substrate. In some embodiments, forming the precursor layer is performed without heating the substrate.

In some embodiments, the precursor layer includes one or two or more different metals, such as the first metal and the second metal, or the first metal, the second metal, and the third metal. In some embodiments, the precursor layer includes a mixed metal hydroxide including two or more different metals, such as the first metal and the second metal, or the first metal, the second metal, and the third metal. In some embodiments, the precursor layer includes a mixed metal-layered double hydroxide including two or more different metals, such as the first metal and the second metal, or the first metal, the second metal, and the third metal. For example, the precursor layer includes a nickel hydroxide, a nickel-layered double hydroxide, a nickel iron hydroxide, a nickel iron-layered double hydroxide, a nickel manganese hydroxide, a nickel manganese-layered double hydroxide, a nickel chromium hydroxide, a nickel chromium-layered double hydroxide, a nickel iron chromium hydroxide, a nickel iron chromium-layered double hydroxide, a nickel cobalt hydroxide, a nickel cobalt-layered double hydroxide, a cobalt iron hydroxide, a cobalt iron-layered double hydroxide, a nickel iron cobalt hydroxide, a nickel iron cobalt-layered double hydroxide, or a combination of two or more thereof.

In some embodiments, annealing the precursor layer in (3) includes heating to a temperature in a range of about 200° C. to about 400° C., about 250° C. to about 350° C., or about 300° C. In some embodiments, annealing is performed in vacuum (e.g., a pressure of about 25 Torr or less, about 20 Torr or less, about 15 Torr or less, about 10 Torr or less, or about 5 Torr or less, and down to about 1 Torr or less) in the presence or under a flow of an inert gas, such as argon (Ar), optionally along with the presence or under a flow of a reducing gas, such as hydrogen gas. In some embodiments, a percentage by volume of the reducing gas, relative to a combined volume of the inert gas and the reducing gas, is about 15% or less, about 10% or less, or about 5% or less, and down to about 1% or less.

In some embodiments, the resulting electrocatalyst layer includes the one or the two or more different metals, such as the first metal and the second metal, or the first metal, the second metal, and the third metal, which can be in an elemental form, in the form of an oxide, or a combination thereof. In some embodiments, the resulting electrocatalyst layer includes a combination of the first metal, an oxide of the first metal, and an oxide of the second metal. In some embodiments, the electrocatalyst layer includes a combination of nickel, nickel oxide, and chromium oxide. In some embodiments, the electrocatalyst layer includes nanostructures of the first metal and the oxide of the first metal, and a layer of the oxide of the second metal coating or covering the nanostructures.

In some embodiments, the precursor layer formed according to the foregoing method of hydrothermal treatment can be formed in, or processed into, a particulate form as precursor particles, and then used to form the cathode 104, by affixing the precursor particles to the substrate, such as by drop-casting the precursor particles, followed by annealing the precursor particles to form electrocatalyst particles affixed to the substrate. In some embodiments, the precursor particles are blended or otherwise combined with nanostructures, and then the precursor particles, along with the nanostructures, are affixed to the substrate, such as by drop-casting, followed by annealing. It is also contemplated that the precursor particles can be affixed to the substrate prior to, or subsequent to, affixing the nanostructures to the substrate. In some embodiments, the nanostructures include a metal, such as the first metal or nickel.

Additional Example Embodiments of Cathode:

In some embodiments, the cathode 104 for HER can be formed according to a manufacturing method including: (1) providing a substrate; (2) forming a precursor layer coating or covering the substrate; and (3) annealing the precursor layer to form an electrocatalyst layer coating or covering the substrate, where forming the precursor layer is in the presence of an electrolyte solution (e.g., an aqueous electrolyte solution) including anions, and the anions are intercalated within or otherwise incorporated within the precursor layer. In some embodiments, the anions include multivalent polyatomic anions having a negative charge state with an absolute value of 2 or greater, 3 or greater, or 4 or greater. Alternatively, or in conjunction, the anions include monovalent polyatomic anions such as bicarbonates ($HCO_3^-$), dihydrogen phosphates ($H_2PO_4^-$), or a combination thereof. In some embodiments, multivalent anions include an anionic oxide of an element of Group 16 of the Periodic Table, such as sulfur. In some embodiments, the multivalent anions include sulfates ($SO_4^{2-}$), sulfites ($SO_3^{2-}$), or a combination thereof. In some embodiments, the multivalent anions include an anionic oxide of an element of Group 15 of the Periodic Table, such as phosphorus. In some embodiments, the multivalent anions include phosphates ($PO_4^{3-}$), hydrogen phosphates ($HPO_4^{2-}$), or a combination thereof. In some embodiments, the multivalent anions include an anionic oxide of an element of Group 14 of the Periodic Table, such as carbon. In some embodiments, the multivalent anions include carbonates ($CO_3^{2-}$). In some embodiments, the multivalent anions include an anionic oxide of an element of Group 13 of the Periodic Table, such as boron. In some embodiments, the multivalent anions include borates. In some embodiments, the multivalent anions include an anionic oxide of a transition metal, such as molybdenum, tungsten, vanadium, or chromium. In some embodiments, the multivalent anions include molybdates, vanadates, or chromates. A concentration of such anions in the electrolyte solution can be in a range of about 0.01 M to about 4 M, about 0.05 M to about 4 M, about 0.1 M to about 4 M, about 0.1 M to about 2 M, or about 0.1 M to about 1 M. In the case of two or more different anions being included in the electrolyte solution, a total concentration of such anions can be within the foregoing stated ranges.

In some embodiments, the substrate includes a first metal, and forming the precursor layer in (2) includes immersing or otherwise coating or exposing the substrate to the electrolyte solution including at least one second metal different from the first metal, followed by drying or heating the substrate. In some embodiments, the first metal and the second metal are different transition metals. In some embodiments, the first metal is nickel. In some embodiments, the second metal is chromium, cobalt, iron, manganese, molybdenum, or tungsten. In some embodiments, the second metal is in the form of a second metal-containing salt, such as an oxide, a nitrate, an acetate, a citrate, a halide (e.g., a chloride), a sulfate, a carbonate, or a combination thereof. In some embodiments, the electrolyte solution includes a third metal different from the first metal and different from the second metal. In some embodiments, forming the precursor layer in (2) includes immersing or otherwise coating or exposing the substrate to a precursor solution including at least the second metal, followed by drying or heating the substrate, and followed by immersing or otherwise exposing the substrate to the electrolyte solution. In some embodiments, a concentration of each metal in the electrolyte solution (or the precursor solution) is in a range of about 0.001 mM to about 100 mM, about 0.001 mM to about 10 mM, about 0.001 mM to about 1 mM, about 0.01 mM to about 100 mM, about 0.01 mM to about 10 mM, or about 0.01 mM to about 1 mM.

In some embodiments, forming the precursor layer in (2) is performed by anodization of the substrate while the substrate is immersed or otherwise exposed to the electrolyte solution to form the precursor layer on, at, or adjacent to a surface of the substrate. In some embodiments, forming the precursor layer by anodization includes applying a current (e.g., anodization current) to the substrate, where the current can be in a range of about 10 mA/cm² to about 400 mA/cm², about 10 mA/cm² to about 350 mA/cm², about 10 mA/cm² to about 300 mA/cm², or about 20 mA/cm² to about 250 mA/cm², and where anodization is performed at a temperature in a range of about 20° C. to about 100° C., about 40° C. to about 100° C., or about 60° C. to about 100° C.

In some embodiments, the precursor layer includes one or two or more different metals, such as the first metal and the second metal, or the first metal, the second metal, and the third metal. In some embodiments, the precursor layer includes an anion or mixture anion-intercalated metal or mixed metal hydroxide or an anion or mixture anion-intercalated metal or mixed metal-layered double hydroxide, where the anions can be monovalent polyatomic anions such as bicarbonates, multivalent anions such as sulfates, phosphates, carbonates, borates, molybdates, vanadates, or chromates, or a combination of two or more thereof. For example, the precursor layer includes a nickel hydroxide carbonate, sulfate, or phosphate; a nickel-layered double hydroxide carbonate, sulfate, or phosphate; a nickel iron hydroxide carbonate, sulfate, or phosphate; a nickel iron-layered double hydroxide carbonate, sulfate, or phosphate; a nickel manganese hydroxide carbonate, sulfate, or phosphate; a nickel manganese-layered double hydroxide carbonate, sulfate, or phosphate; a nickel chromium hydroxide carbonate, sulfate, or phosphate; a nickel chromium-layered double hydroxide carbonate, sulfate, or phosphate; a nickel iron chromium hydroxide carbonate, sulfate, or phosphate; a nickel iron chromium-layered double hydroxide carbonate, sulfate, or phosphate; a nickel cobalt hydroxide carbonate, sulfate, or phosphate; a nickel cobalt-layered double hydroxide carbonate, sulfate, or phosphate; a cobalt iron hydroxide carbonate, sulfate, or phosphate; a cobalt iron-layered double hydroxide carbonate, sulfate, or phosphate; a nickel iron cobalt hydroxide carbonate, sulfate, or phosphate; a nickel iron cobalt-layered double hydroxide carbonate, sulfate, or phosphate; or a combination of two or more thereof.

In some embodiments, annealing the precursor layer in (3) includes heating to a temperature in a range of about 200° C. to about 400° C., about 250° C. to about 350° C., or about 300° C. In some embodiments, annealing is performed in vacuum (e.g., a pressure of about 25 Torr or less, about 20 Torr or less, about 15 Torr or less, about 10 Torr or less, or about 5 Torr or less, and down to about 1 Torr or less) in the presence or under a flow of an inert gas, such as argon (Ar), optionally along with the presence or under a flow of a reducing gas, such as hydrogen gas. In some embodiments, a percentage by volume of the reducing gas, relative to a combined volume of the inert gas and the reducing gas, is about 15% or less, about 10% or less, or about 5% or less, and down to about 1% or less.

In some embodiments, the resulting electrocatalyst layer includes the one or the two or more different metals, such as the first metal and the second metal, or the first metal, the second metal, and the third metal, which can be in an elemental form, in the form of an oxide, or a combination thereof, and where the anions are intercalated within or otherwise incorporated within the electrocatalyst layer.

In some embodiments, the electrocatalyst layer formed according to the foregoing method can be formed in, or processed into, a particulate form as electrocatalyst particles, and then used to form the cathode 104, by affixing the electrocatalyst particles to the substrate, such as by coating the electrocatalyst particles along with a binder.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Facile Electrodeposition of a Highly Active and Stable Hydrogen Evolution Catalyst Introduction:

A catalyst composed of Earth-abundant metals (e.g., Ni and Cr) is developed that can rival Pt in activity while demonstrating exceptional stability in alkaline electrolytes. The catalyst includes nanoscale Ni—NiO heterostructures that are blended with a corrosion-resistant $Cr_2O_3$ layer (referred to as Cr—Ni—NiO or CrNN) and coated onto a porous Ni foam substrate. The catalyst exhibits excellent activity and stability for hydrogen evolution in about 1 M KOH. With an overpotential of about 110 mV, the catalyst can deliver about 100 mA/cm² of HER current with a catalyst loading density of about 34 mg/cm². For comparison, a commercial 30 wt. % Pt on carbon catalyst achieves about 100 mA/cm² at an overpotential of just under about 100 mV and a catalyst loading density of about 8 mg/cm². In addition, the CrNN catalyst shows no noticeable performance decay over about 80 hours at a high current density of about 200-250 mA/cm². However, the catalyst synthesis can be time-consuming and involves a hydrolysis stage in N,N-dimethylformamide (DMF, which is a toxic solvent that impacts the catalyst's scalability prospects) and a significant amount of material (about 34 mg/cm²) is included to achieve high activity.

The first stage of the CrNN synthesis is the hydrolysis of $Ni(CH_3COO)_2$ and $Cr(NO_3)_3$ (about 8:1 Ni:Cr) in wet DMF at about 90° C. for about 4 hours to form NiCr-layered double hydroxide nanoplates. These nanoplates are then suspended in ethanol along with about 20 nm Ni nanoparticles and slowly loaded into a porous Ni foam substrate (>about 10 hours at about 10 minute intervals) until a desired loading density is achieved. A resulting electrode is then annealed in vacuum under Ar flow (about 1.3-1.4 Torr) at about 300° C. to convert the hydroxide to oxide followed by partial reduction of the NiO, resulting in a mixed Ni—NiO—$Cr_2O_3$ structure that is active for HER. The entire process takes between about 15-20 hours An improved electrodeposition method is developed that significantly reduces the time to form CrNN and eliminates the DMF hydrolysis stage. First, a small amount (e.g., 2 mg/cm²) of a high surface area material (about 20 nm Ni or oxidized multi-walled carbon nanotubes, MWCNTs) is loaded onto Ni foam from an ethanol suspension in under about 2 hours. Next, NiCr hydroxide is electrodeposited onto this substrate via the reduction of nitrate ions in an aqueous solution of $Ni(NO_3)_2$ and $Cr(NO_3)_3$ (about 8:1 Ni:Cr) at a stirring rate of about 100 rpm. Finally, a resulting electrode is annealed in vacuum under Ar+about 1.5% $H_2$ flow (about 1.3-1.4 Torr) at about 300° C. to form the active mixed Ni—NiO—$Cr_2O_3$ material (referred to as E-CrNN). The entire process takes about 5-6 hours and the electrodeposition of the catalyst is generally considered to be highly scalable.

Figure 1A:
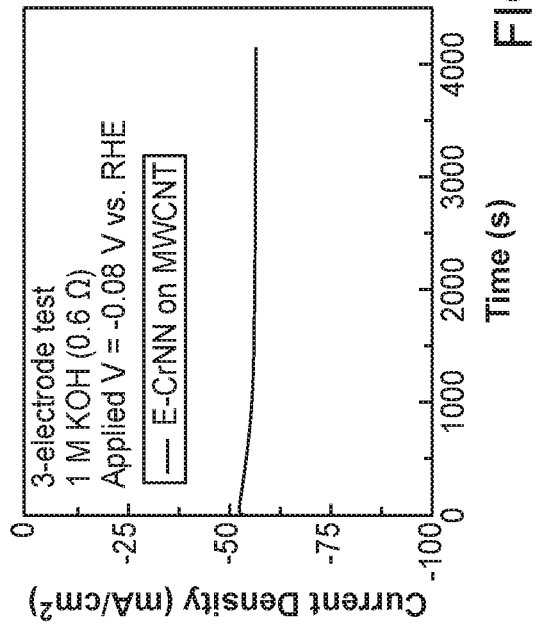
FIG. 1: Activity and stability of E-CrNN on Ni nanoparticles and MWCNT in about 1 M KOH. a) Linear sweep voltammogram (LSV) of Cr—Ni—NiO catalyst formed by electrodeposition (E-CrNN) on multi-walled carbon nanotube (MWCNT) in about 1 M KOH at about 5 mV/s and R=about 0.6 ohms showing excellent activity. b) Substantially constant voltage of E-CrNN at about −0.08 V vs. RHE in about 1 M KOH showing short-term stability. c) LSV scans of E-CrNN on various high surface area substrates paired with a NiFe-layered double hydroxide (NiFe-LDH) anode in about 1 KOH at about 5 mV/s and R=about 1.1 ohms. d) Substantially constant current measurement of E-CrNN vs. NiFe-LDH electrolyzer in about 1 M KOH at about 400 mA/cm$^2$ and about 1.1 ohms. iR compensation was not applied to these electrochemical tests.
Figure 1B:
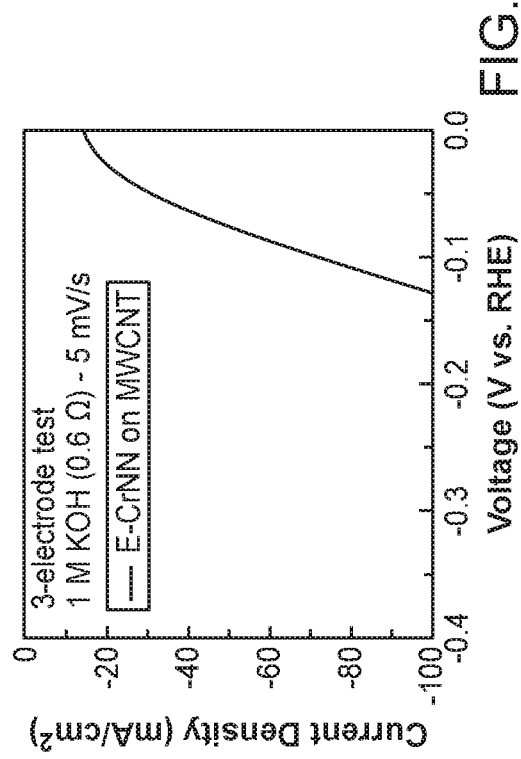

Results and Discussion:

FIG. 1a shows the 3-electrode activity of E-CrNN grown on about 2 mg/cm² of oxidized MWCNT. In a cathodic linear sweep, it is able to reach about 100 mA/cm² at an overpotential of about 125 mV and a loading density of about 8.5 mg/cm², just slightly worse than the about 34 mg/cm² CrNN electrode. However, comparing the current density per mass of catalyst at about 100 mV of overpotential shows the E-CrNN electrode (about 8.5 A/g) has an advantage over the CrNN electrode (about 2.3 A/g). This improved mass activity can aid in reducing costs and materials if electrodes are scaled up for production. The E-CrNN electrode also demonstrates excellent short-term stability in about 1 M KOH (FIG. 1b).

Figure 1C:
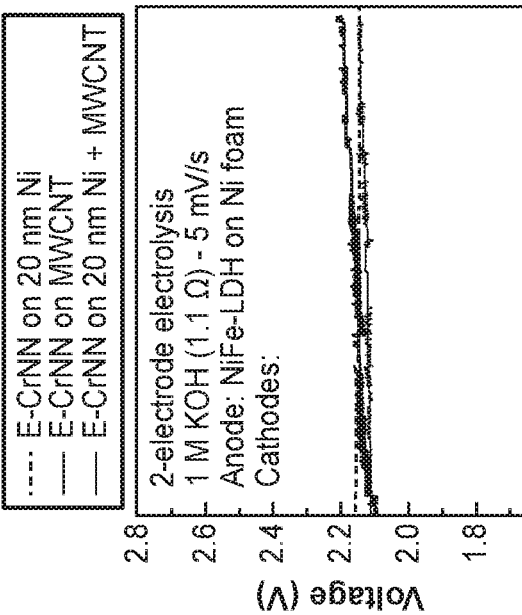
Figure 1D:
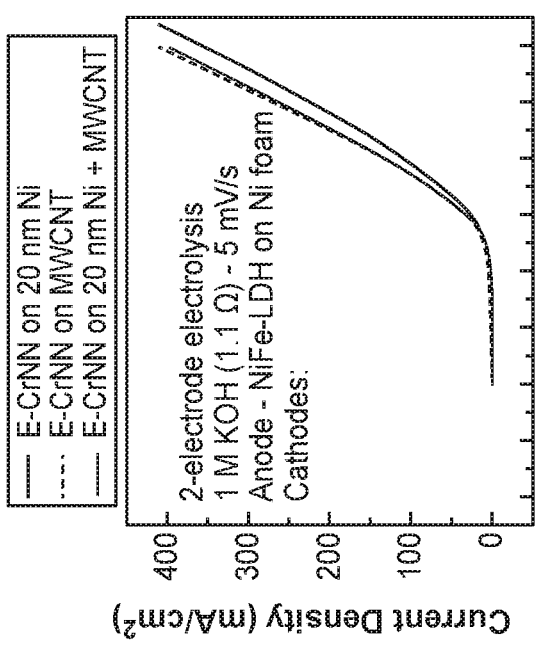

In order to determine the stability of the E-CrNN electrode in an electrolyzer, NiFe-layered double hydroxide (NiFe-LDH) is electrodeposited on Ni foam (a highly active OER catalyst) and used as an anode vs. the E-CrNN electrode. In FIG. 1c, the two-electrode activity of E-CrNN is shown on about 20 nm Ni, MWCNT and a mixture of about 1 mg of about 20 nm Ni+about 1 mg of MWCNT. From this data, it can be seen that the catalysts grown on MWCNT show a slight activity advantage over the E-CrNN grown on about 20 nm Ni. However, the E-CrNN grown on about 20 nm Ni shows activation and better stability than the MWCNT sample (FIG. 1d). This same activation process was also observed for CrNN mixed with about 20 nm Ni particles.

Figure 2A:
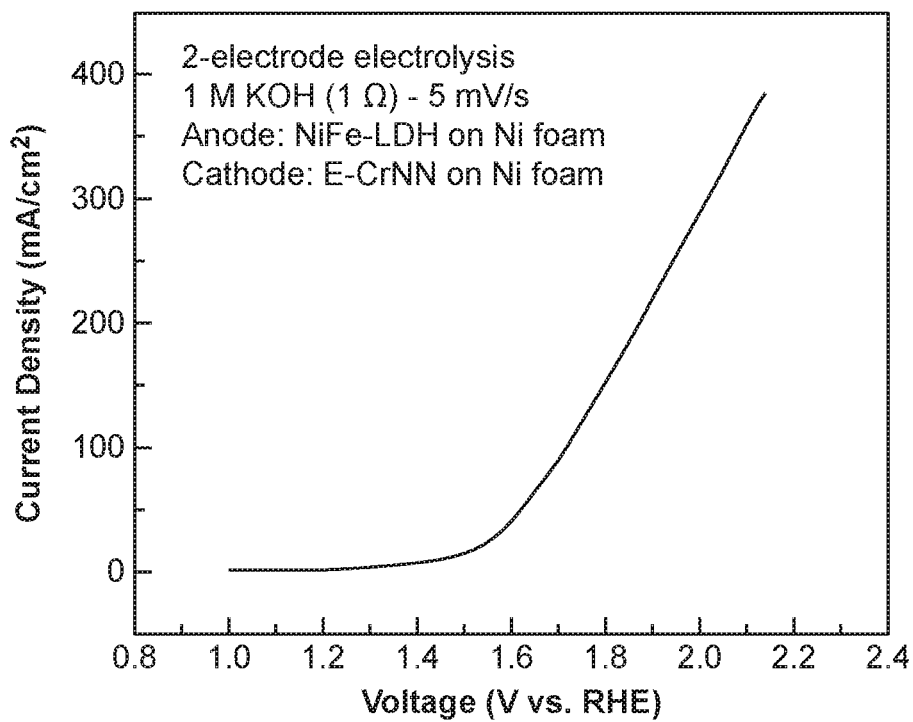
FIG. 2: Activity and stability of E-CrNN on Ni in about 1 M KOH. a) LSV of E-CrNN vs. NiFe-LDH in about 1 M KOH showing high activity without 20 nm Ni or MWCNT substrates. b) Substantially constant current experiment at about 400 mA/cm$^2$ of E-CrNN on Ni foam vs. NiFe-LDH in about 1 M KOH. iR compensation was not applied to either test.
Figure 2B:
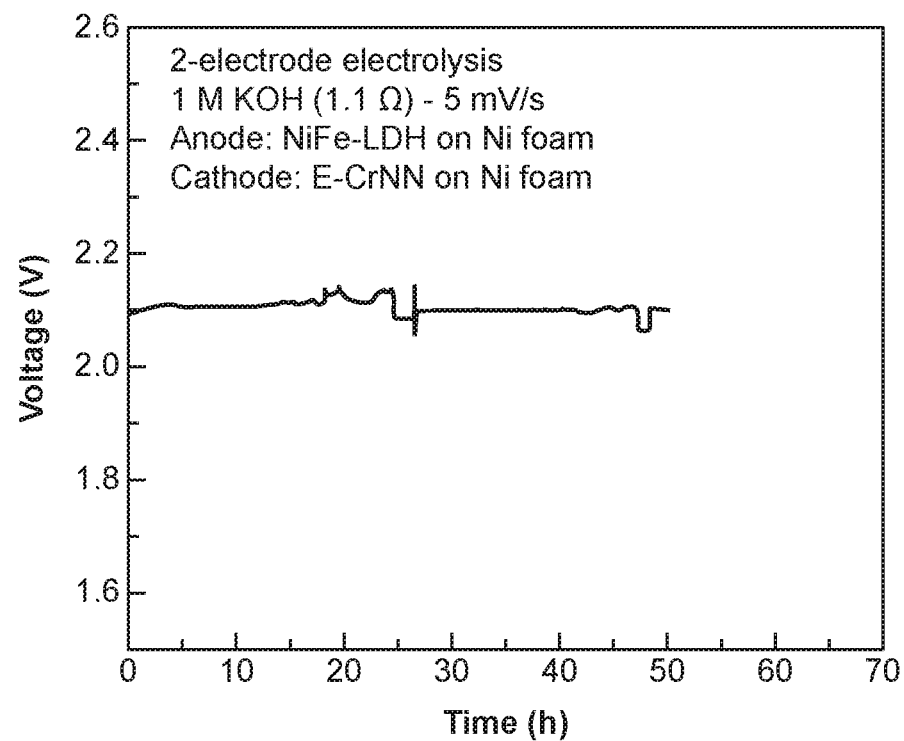

It is possible to further simplify the synthesis procedure and deposit a NiCr hydroxide directly on a Ni foam without the addition of Ni nanoparticles or MWCNT. An active catalyst can be grown directly on the Ni foam by not stirring a solution and lowering a total charge passed during electrodeposition. After annealing in vacuum under Ar+$H_2$ flow, the resulting Ni—NiO—$Cr_2O_3$ material still maintains a high surface area and impressive activity without the about 20 nm Ni/MWCNT substrate. FIG. 2 shows the activity and stability achieved with this further streamlined synthesis.

A synthesis procedure is developed that reduces time, costs and materials, and that produces a highly active, stable and scalable catalyst for HER. When paired with an active OER electrode in about 1 M KOH, the pair can deliver high current densities (e.g., about 400 mA/cm² or more) at low voltages (e.g., about 2.1-2.2 V or less) for multiple days (e.g., about 80 hours or more) without noticeable decay. These results demonstrate that the E-CrNN catalyst can be used in practical electrolysis applications.

Methods:

CrNN Electrodeposition

About 420 g/m² of a Ni foam is sonicated in acetone for about 10 minutes followed by further sonication in ethanol for about 10 minutes. After drying on a hotplate, a suspension of about 20 nm Ni nanoparticles (US Research nanomaterials) or oxidized MWCNT (made following a reported procedure with a 2 times oxidation condition—Gong, M. et al. Nanoscale nickel oxide/nickel heterostructures for active hydrogen evolution electrocatalysis. *Nat Commun* 5, 4695 (2014)) in ethanol (about 1 mg/mL) is sonicated for about 30 minutes. The suspension is then loaded into an about 1 cm² piece of clean Ni foam until a loading density of about 2 mg/cm² is achieved. The foam is then placed in a three-electrode cell with a parallel-facing stainless steel 316 (MTI) foil counter electrode and a saturated caramel electrode (SCE, satd.) KCl reference electrode. The electrolyte is composed of about 30 mM $Ni(NO_3)_2$ (Sigma Aldrich, about 98%) with about 3.75 mM $Cr(NO_3)_3$ (Sigma Aldrich, about 98%) in about 150 mL of solution. The solution is stirred at about 100 rpm using a magnetic stir plate and a potential of about −1.3 V vs. SCE (R=about 15 ohms) is applied to the working electrode until about 125 C of charge is passed and a green film is formed on the electrode surface. The electrode is rinsed with water followed by ethanol and dried at about 90° C. on a hotplate. Once dry, the electrode is annealed in a vacuum oven under Ar+$H_2$ flow (about 1370 standard cubic centimeters per minute (sccm) Ar+about 20 sccm $H_2$) at a pressure of about 1.3-1.4 Torr. The chamber is continuously pumped to remove $H_2O$ and $O_2$ generated during the annealing. Once annealed, the electrode is ready for testing. The catalyst loading is determined by weighing the Ni foam before and after deposition. The total material loading is about 6.5 mg/cm² of CrNN+about 2 mg/cm² of Ni or MWCNT (about 8 mg/cm² total loaded material).

For deposition directly on a Ni foam, the above procedure was used with two modifications: no stirring is carried out during the deposition and about 50 C of charge is passed. Less charge is involved because a stronger pH gradient builds up without solution stirring and so the NiCr hydroxide deposits faster. After annealing, this electrode had a loading of about 10 mg/cm².

NiFe-LDH Electrodeposition

Ni foam (about 420 g/m², degreased via sonication in acetone and ethanol) is placed in an about 150 mL solution of about 6 mM $Ni(NO_3)_2$ (Sigma-Aldrich, about 98%) with about 2 mM $Fe(NO_3)_3$ (Sigma-Aldrich, about 98%) as the working electrode with Pt mesh (counter) and Ag/AgCl satd. KCl (reference). The solution was kept at about 10° C. and stirred at about 100 rpm. The working electrode was held at about −1 V vs. Ag/AgCl satd. KCl (R=about 20 ohms) for about 45 minutes and a hydroxide layer was formed. The electrode was rinsed with deionized water and then dried at room temperature.

Electrochemical Testing

Three-electrode tests were carried out with a CrNN electrode as the working electrode, Ni foam as the counter electrode and SCE satd. KCl as the reference electrode on a CHI-760 potentiostat. The reference was calibrated against and converted to the reversible hydrogen electrode (RHE).

For high current and long-term stability testing, a two-electrode cell was constructed using a CrNN cathode and a NiFe-LDH anode in about 1 M KOH. The cell was then connected to a CHI-760 potentiostat and a linear sweep voltammogram was carried out to determine the cell resistance (about 1-1.2 ohms) and the voltage to reach about 400 mA/cm². The cell was then connected to a battery tester under galvanostatic mode with a current density of about 400 mA/cm². Water was added to the cell every about 24 hours to maintain a substantially constant electrolyte level.

Example 2

Highly Active and Stable Hydrogen Evolution Catalyst Formed by Annealing NiCr-Layered Double Hydroxide An in-situ grown NiCr-LDH first on a Ni foam, followed by H₂/Ar annealing, was also formed to yield an active CrNN catalyst for HER. The in-situ grown NiCr-LDH on the Ni foam was formed by dipping about 1 cm×about 4 cm Ni foam into a mixture of about 1.2 mL of about 0.5 M $Ni(NO_3)_3$, about 0.6 mL of about 0.5 M $Cr(NO_3)_3$, about 15 mL of deuterium-depleted water (DDW), and about 0.12 g of urea, followed by about 120° C. hydrothermal treatment for about 12 hours. The Ni foam was sonicated in about 1-2% hydrochloric acid (HCl) to remove a native oxide layer for about 5 minutes before reaction. After the reaction is complete, the sample was washed with DDW and ethanol 2 times, and dried on a hotplate. The sample was then annealed in a vacuum oven under Ar+H₂ flow (about 1370 sccm Ar+about 20 sccm H₂) at a pressure of about 1.3-1.4 Torr. The chamber is continuously pumped to remove H₂O and O₂ generated during annealing.

Figure 3A:
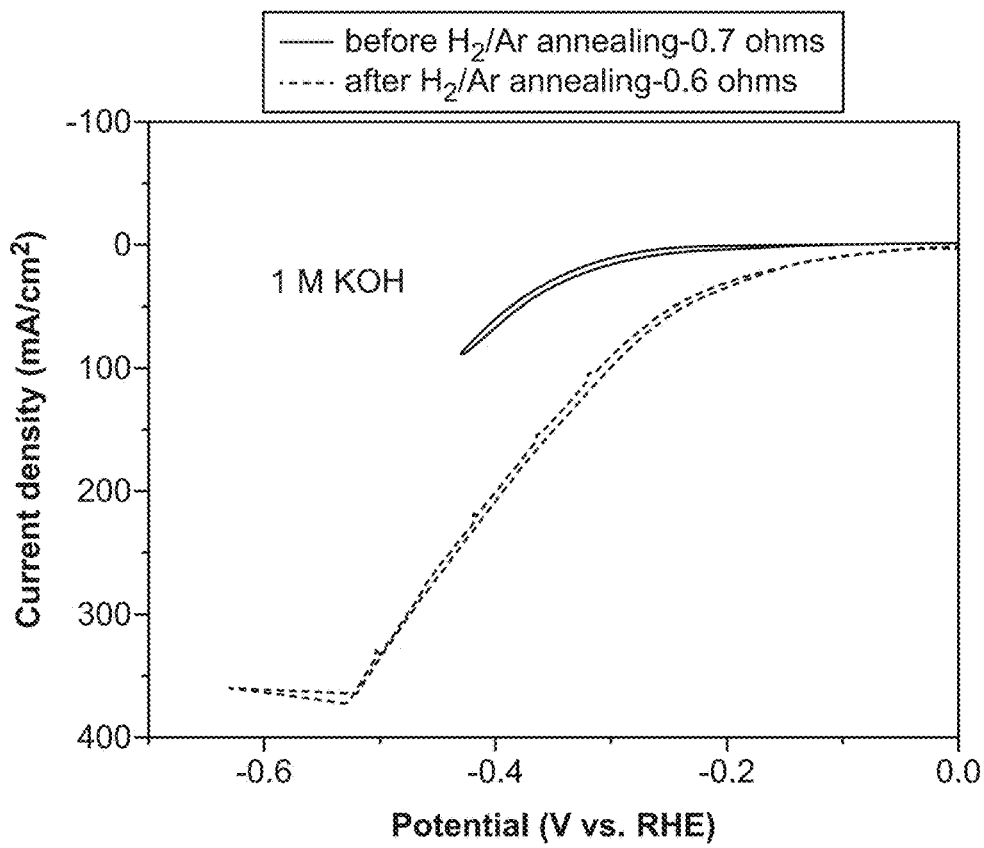
FIG. 3: a) LSVs of Ni foam/NiCr-LDH before and after annealing in about 2% H$_2$/Ar in about 1 M KOH. b) Stability test of Ni foam/NiCr-LDH annealed in about 2% H$_2$/Ar in about 1 M KOH, at substantially constant current of about 100 mA/cm$^2$ in three-electrode configuration. iR was not compensated in these tests.
Figure 3B:
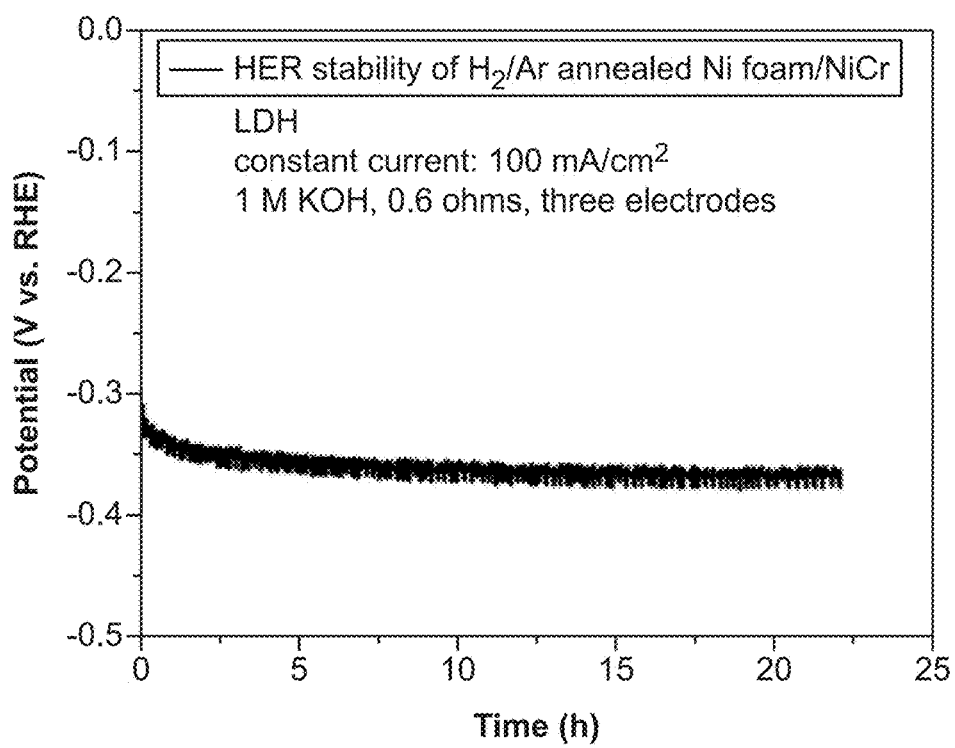

FIG. 3a shows the HER activity of the in-situ grown NiCr-LDH on Ni foam, and after annealing at about 2% H₂. The in-situ grown NiCr-LDH specifies an overpotential of about 440 mV to reach about 100 mA/cm², while the annealed sample specifies an overpotential of about 310 mV to reach 100 mA/cm². The in-situ grown NiCr-LDH followed by H₂/Ar annealing affords another approach of forming active HER catalysts. FIG. 3b shows the three-electrode HER stability of annealed NiCr-LDH on Ni foam, at a high current density of about 100 mA/cm², where the catalyst shows good stability after a minor decay, and it specifies an overpotential of about 360 mV to maintain the current at about 100 mA/cm² for more than 22 hours.

Besides, NiCr-LDH was also synthesized by a hydrothermal approach in the form of particles, and then the particles were drop-dried on a Ni foam, followed by annealing in H₂/Ar.

Figure 4A:
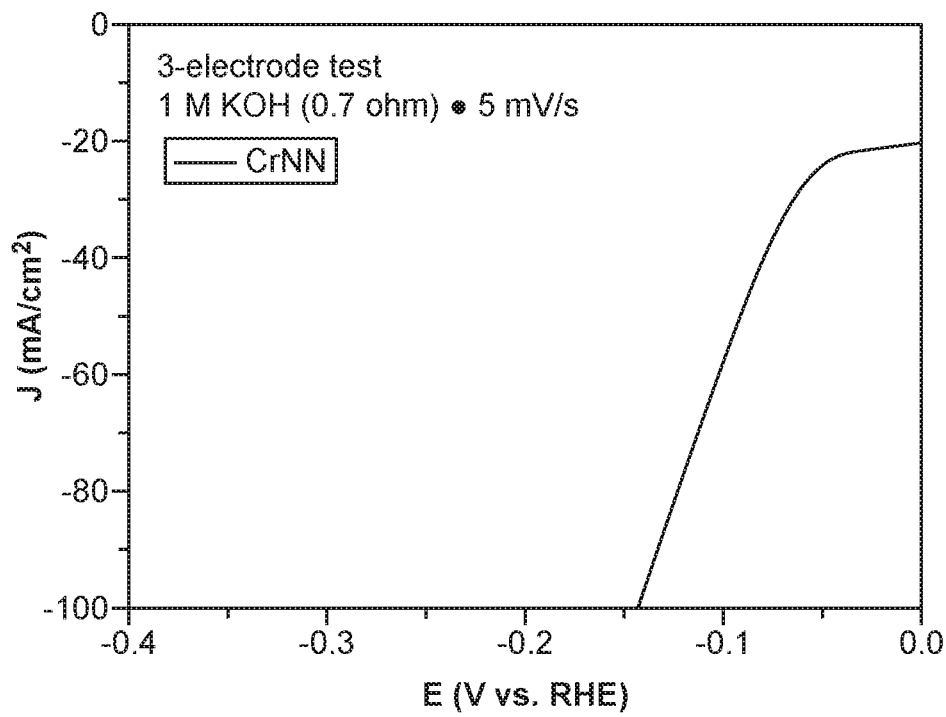
FIG. 4: Activity and stability of CrNN on Ni foam in about 1 M KOH. a) LSV of CrNN on Ni foam in about 1 M KOH at about 5 mV/s and R=about 0.7 ohms showing excellent activity. b) Substantially constant current measurement of CrNN vs. NiFe-LDH in an electrolyzer including about 1 M KOH at about 400 mA/cm$^2$ and about 0.8-1.1 ohm. iR compensation was not applied to these electrochemical tests.
Figure 4B:
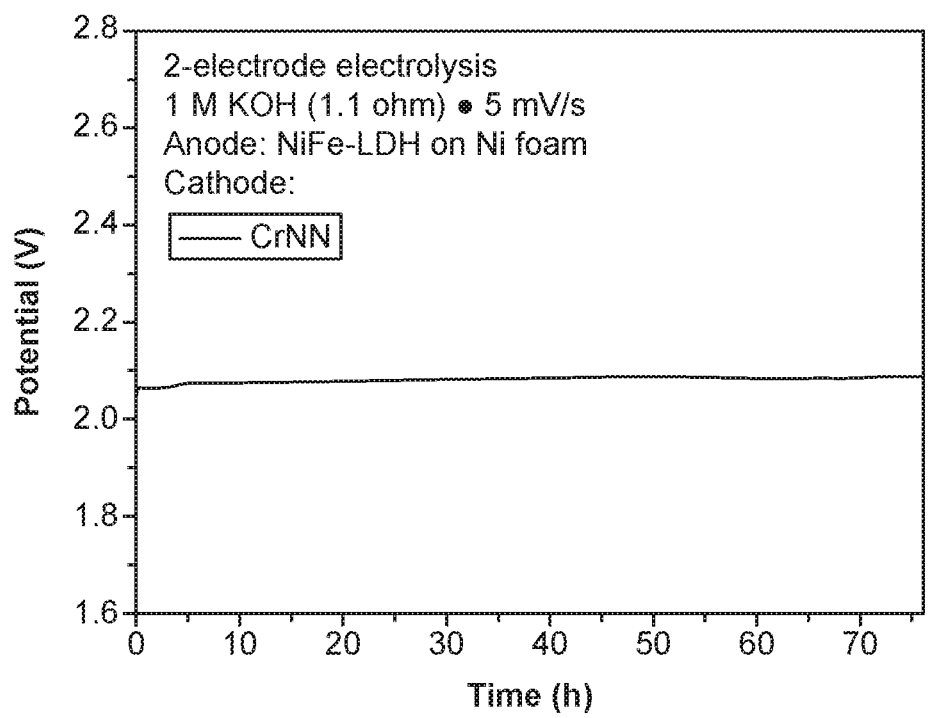

FIG. 4a shows the three-electrode HER activity of CrNN on Ni foam. In the linear sweep voltammogram, the CrNN achieved a current density of about 100 mA/cm² at an overpotential of about 143 mV. In order to determine the stability of the CrNN electrode in an electrolyzer, long-term stability was tested in a two-electrode system. NiFe-LDH drop-dried on a Ni foam (a highly active OER catalyst) was used as an anode vs. the CrNN cathode. The curve in FIG. 4b shows that the CrNN catalyst can be stable at a high current density of about 400 mA/cm² under a nearly constant voltage of about 2.08 V (without iR compensation) for over 75 hours.

Figure 5A:
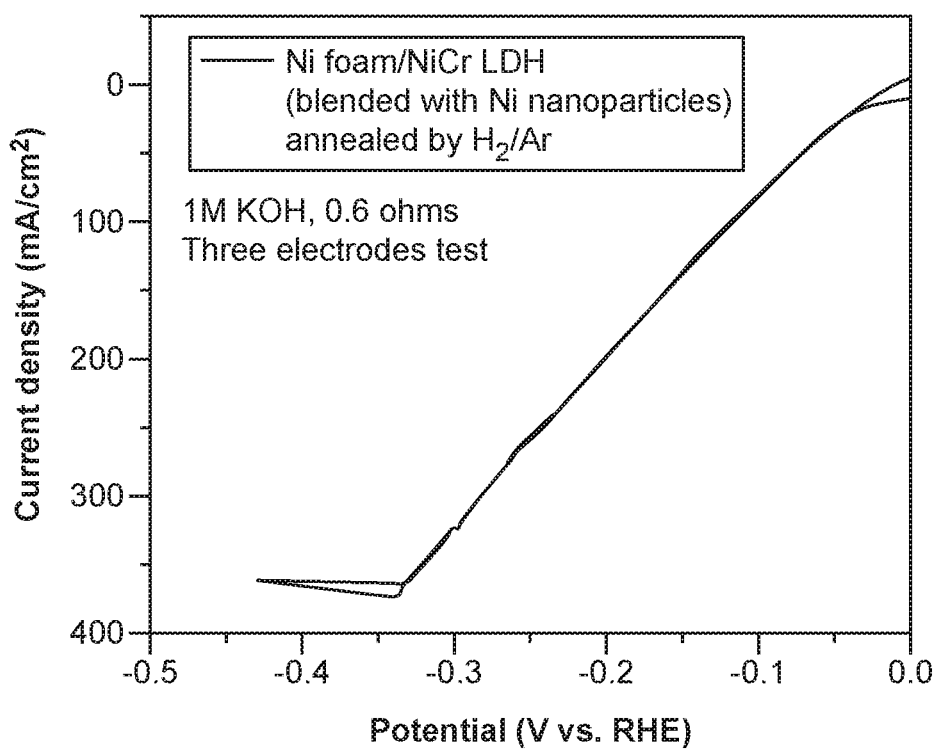
FIG. 5: a) LSVs of Ni foam/NiCr-LDH (blended with Ni nanoparticles) annealed in about 2% H$_2$/Ar in H$_2$ saturated about 1 M KOH. b) Stability test of Ni foam/NiCr-LDH (blended with Ni nanoparticles) annealed in about 2% H$_2$/Ar in about 1 M KOH, at a substantially constant voltage of about −0.13 V in three-electrode configuration. iR was not compensated in these tests.
Figure 5B:
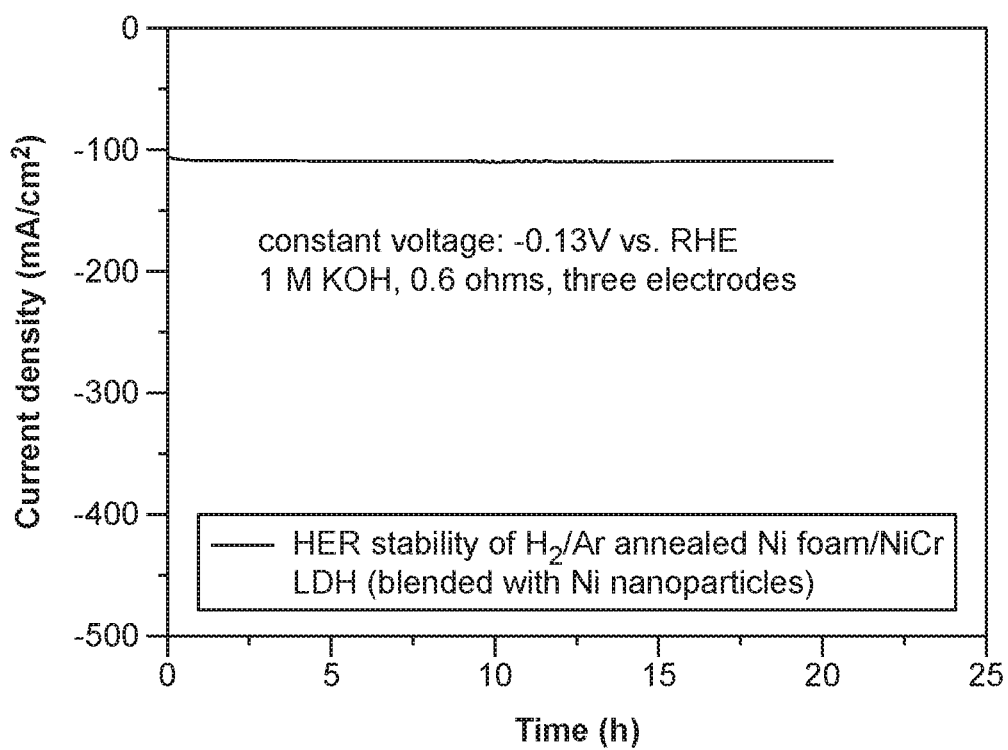

The HER stability of Ni foam/NiCr-LDH synthesized by a hydrothermal approach can be further improved by blending with about 10-80% (by weight) Ni nanoparticles (size: about 20 nm) first, then drop-casted on a Ni foam. FIG. 5a shows the HER activity of the Ni foam/NiCr-LDH (blended with Ni nanoparticles) annealed in about 2% H₂/Ar. It specifies an overpotential of about 130 mV to reach about 100 mA/cm². The stability was improved significantly by adding about 10 mg Ni nanoparticles in about 10 mg NiCr-LDH (Ni:Cr=about 10:1 molar ratio) before drop-casting. FIG. 5b shows the three-electrode stability test of the sample at a substantially constant voltage of about −0.13 V vs. RHE, where the HER activity shows no noticeable decay for more than 21 hours.

Method:

Synthesis of NiCr-LDH by Hydrothermal Treatment

About 0.6 mmol $Ni(CH_3COO)_2$ (Sigma Aldrich, about 99.998%), about 0.05 mmol $Cr(NO_3)_3$ (Sigma Aldrich, about 98%) and urea (about 2 mmol, Sigma Aldrich, about 99.0%) were dissolved in about 15 mL of deionized water to form a homogeneous solution. The mixed solution was transferred into an autoclave and heated at about 120° C. for about 6 hours then cooled down to room temperature. The resulting suspension was centrifuged and washed with about 1:1 volume ratio of water and ethanol. Anhydrous ethanol was used for a final washing step. NiCr-LDH precipitate (in the form of particles) was redispersed in ethanol and sonicated for about 30 minutes to form a uniform suspension and then drop-dried onto an about 1 cm² piece of clean Ni foam at about 90° C. on a hotplate until the loading density reached about 10 mg/cm². The weight of the catalyst active mass loading in the electrode was determined by the difference in Ni foam weight before loading and after loading. After the drop-drying process, the electrode was annealed in a vacuum oven under Ar+H₂ flow (about 1370 sccm Ar+about 20 sccm H₂) at a pressure of about 1.3-1.4 Torr for about 1 hour. The chamber is continuously pumped to remove H₂O and O₂ generated during the annealing.

Example 3

Highly Active and Stable Hydrogen Evolution Catalysts Formed by Annealing Hydroxide Carbonates NiCr-hydroxide carbonate (NiCr—HC) was formed by dipping a piece of Ni foam in about 0.5 M $K_2Cr_2O_7$ solution for about 3 hours, and then the sample was removed and dried on a hotplate for about 30 minutes, and, after that, the sample was anodized against another piece of Ni foam in about 0.1 M $KHCO_3$, where the anodization condition was about 20 mA/cm$^2$ for about 16 hours in an about 80° C. oil bath. Another NiCr—HC based cathode was formed by using a modified approach: A piece of Ni mesh/Ni foam was paired against a Pt mesh or another piece of Ni mesh/foam, and anodized in a mixture of about 0.1 M $KHCO_3$ and about 0.1-1 mM $Cr(NO_3)_3$. The anodization was performed at about 20 mA/cm$^2$ for about 16 hours in an about 80° C. oil bath. The annealing procedure for NiCr—HC post-treatment was similar to that of E-CrNN: NiCr—HC was annealed in a vacuum oven under Ar+$H_2$ flow (about 1370 sccm Ar+about 20 sccm $H_2$) at a pressure of about 1.3-1.4 Torr. The chamber is continuously pumped to remove $H_2O$ and $O_2$ generated during annealing.

Figure 6A:
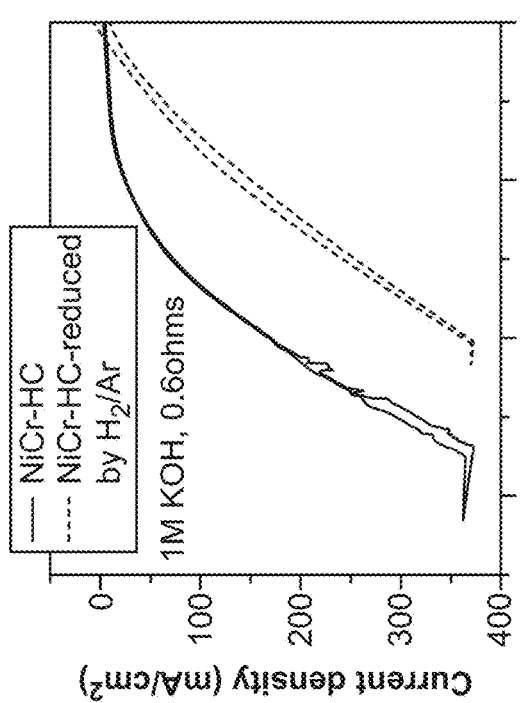
FIG. 6: LSVs of a) Ni foam, Ni foam-dip chromate-hydroxide carbonate (HC), and Ni foam-dip chromate-HC annealed in about 2% H$_2$/Ar; b) Ni foam-Cr—HC and Ni foam-Cr—HC annealed in about 2% H$_2$/Ar; and c) Ni mesh-Cr—HC annealed in about 2% H$_2$/Ar in about 1 M KOH. d) Substantially constant current test at about 400 mA/cm$^2$ of Ni mesh-Cr—HC (annealed) vs. NiFe-LDH in about 1 M KOH. iR was not compensated in these experiments.
Figure 6B:
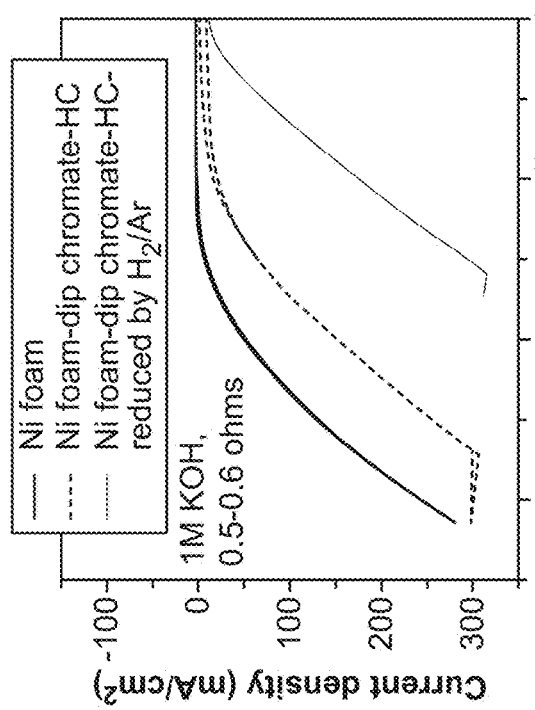
Figure 6C:
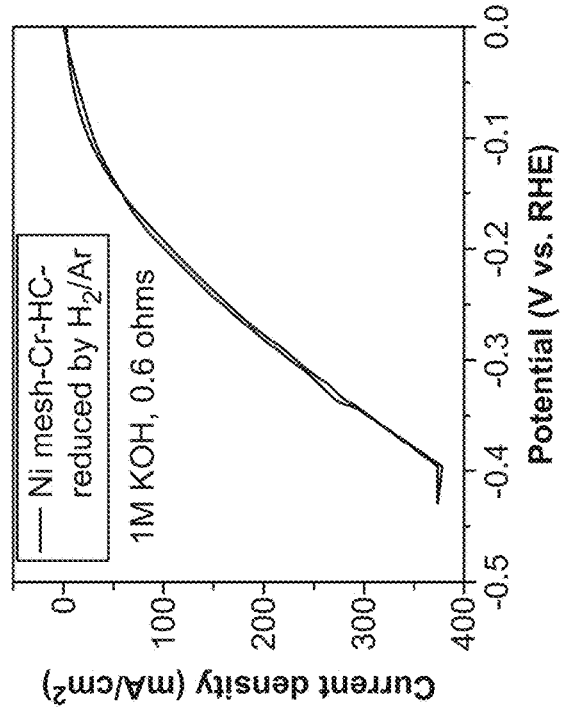
Figure 6D:
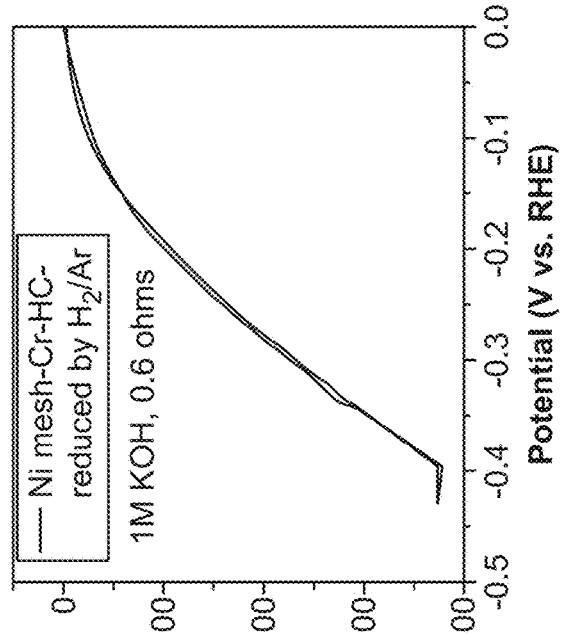

FIG. 6a shows the HER activity of Ni foam, Ni foam-dip chromate-HC, annealed Ni foam-dip chromate-HC in about 1 M KOH, where the three samples specify overpotentials of about 460 mV, about 340 mV and about 130 mV to reach about 100 mA/cm$^2$, respectively, without iR compensation. The activity of annealed Ni foam-dip chromate-HC is on par with that of the E-CrNN catalyst. Due to the toxicity of chromate, the method of forming NiCr—HC was modified by adding $Cr(NO_3)_3$ in a bicarbonate electrolyte. The NiCr—HC followed by $H_2$/Ar annealing forms a highly active HER catalyst. FIG. 6b compares the HER activity of NiCr—HC and annealed NiCr—HC. The overpotential to reach about 100 mA/cm$^2$ is about 330 mV and about 150 mV, respectively. The modified method of forming NiCr—HC was further extended to Ni mesh substrate by using the same synthesis conditions followed by the same annealing procedure. FIG. 6c shows the HER activity of annealed Ni mesh-Cr—HC in about 1 M KOH, where it specifies an overpotential of about 200 mV to reach about 100 mA/cm$^2$, slightly higher than by using Ni foam, possibly due to the higher surface area of the foam than the mesh substrate. The long-term stability of the annealed Ni mesh-Cr—HC was further evaluated in a two-electrode configuration by pairing with a highly active anode: Ni foam-load NiFe-LDH. The electrolyzer specified about 2.1-2.2 V to reach about 400 mA/cm$^2$, and was stable >300 hours without showing noticeable decay (FIG. 6d).

The practical application of Ni foam-Cr—HC was evaluated in high temperature at about 80° C. (considering the heat generated in a practical electrolyzer can heat up the whole system) (FIG. 7). In addition, the usage of a simulated seawater electrolyte was also attempted at the same time in order to demonstrate the concept of using seawater instead of fresh water in the electrolyzer. Remarkably, the electrolyzer using annealed Ni mesh-Cr—HC as a cathode paired with a Ni foam-load NiFe-LDH anode showed excellent activity, about 1.93V to reach about 400 mA/cm$^2$, and good stability for nearly 500 hours. The electrolyte was a mixture of about 6 M KOH, about 0.5 M $K_2CO_3$ and about 0.5 M NaCl.

A stainless steel (SS)—HC based cathode was formed, followed by annealing in about 2% $H_2$/Ar, by using a modified approach to that of NiCr—HC. A piece of SS was paired against a Pt mesh and anodized in about 0.1 M $KHCO_3$, where the anodization condition was about 20-250 mA/cm$^2$ for about 16 hours in an about 80° C. oil bath. The annealing condition was the same as that performed on NiCr—HC.

FIG. 8 shows the HER activity of SS mesh, about 2% $H_2$/Ar annealed SS—HC (about 50 mA), and about 2% $H_2$/Ar annealed SS—HC (about 150 mA). The SS mesh without annealing specifies an overpotential of about 640 mV to reach about 100 mA/cm$^2$, while the two $H_2$/Ar annealed SS—HC samples specify about 450 mV to reach about 100 mA/cm$^2$. The anodization process followed by $H_2$/Ar annealing provides significant improvement of the HER activity of SS and can be extended to other metallic HER catalysts.

As used herein, the singular terms "a," "an," and "the" may include plural referents unless the context clearly dictates otherwise. Thus, for example, reference to an object may include multiple objects unless the context clearly dictates otherwise.

As used herein, the terms "connect," "connected," "connecting," and "connection" refer to an operational coupling or linking. Connected objects can be directly coupled to one another or can be indirectly coupled to one another, such as through another set of objects.

As used herein, the term "nanostructure" refers to an object that has at least one dimension in the nm range, namely from about 1 nm to about 1000 nm.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A method of forming a cathode for hydrogen evolution reaction, the method comprising:
    loading a substrate with carbon nanotubes or nanostructures comprising a metal;
    forming a precursor layer covering the substrate by electrodepositing the precursor layer onto the substrate from a precursor solution comprising a salt of a first metal and a salt of a second metal, wherein the first metal and the second metal are different transition metals; and
    annealing the precursor layer to form an electrocatalyst layer covering the substrate, wherein a combined time to perform the loading, the electrodepositing, and the annealing is about 5-6 hours.

2. The method of claim 1, wherein the substrate is a metallic foam, foil, or mesh.

3. The method of claim 1, wherein the first metal is nickel, and the second metal is chromium.

4. The method of claim 1, wherein the electrocatalyst layer comprises nickel, nickel oxide, and chromium oxide.

5. The method of claim 1, wherein the precursor solution comprises a salt of a third metal, and the third metal is cobalt, iron, manganese, molybdenum, or tungsten.

6. The method of claim 1, wherein a molar ratio of the first metal to the second metal in the precursor solution is greater than 1:1.

7. The method of claim 1, wherein the precursor layer comprises a mixed metal hydroxide comprising the first metal and the second metal.

8. The method of claim 1, wherein the precursor layer comprises a mixed metal-layered double hydroxide comprising the first metal and the second metal.

9. The method of claim 1, wherein annealing the precursor layer includes heating to a temperature in a range of 200° C. to 400° C.

10. The method of claim 9, wherein annealing the precursor layer is performed in vacuum under a flow of an inert gas.

11. The method of claim 9, wherein annealing the precursor layer is performed in vacuum under a flow of an inert gas and a flow of a reducing gas.

12. The method of claim 1, wherein the electrocatalyst layer comprises a mixed $Ni-NiO-Cr_2O_3$ structure.

13. The method of claim 1, wherein the carbon nanotubes are multi-walled carbon nanotubes (MWCNTs).

14. The method of claim 1, wherein a molar ratio of the first metal to the second metal in the precursor solution is about 5:1 or greater.

15. A method of forming a cathode for hydrogen evolution reaction, the method comprising:
    loading a substrate with carbon nanotubes or nanostructures comprising a metal;
    forming a precursor layer covering the substrate by electrodepositing the precursor layer onto the substrate from a precursor solution comprising a salt of a first metal and a salt of a second metal, wherein the first metal and the second metal are different transition metals; and
    annealing the precursor layer to form an electrocatalyst layer covering the substrate,
    wherein the electrodepositing is performed for about 2 hours.

* * * * *